United States Patent Office 3,405,197
Patented Oct. 8, 1968

3,405,197
COMPOSITIONS DERIVED FROM POLY-1,2-EPOX-
IDE COMPOUNDS AND AMIDES OF AMINES
INCLUDING AT LEAST 20% TETRAHYDROTRI-
CYCLOPENTADIENYLENE DIAMINE AND DI-
CARBOXYLIC ACIDS
Hugo Schaedler, Maikammer, Pfalz, Franz Steden, Mannheim, and Ludwig Schuster, Ludwigshafen (Rhine), Germany, assignors to Badische Anilin- & Soda-Fabrik Aktiengesellschaft, Ludwigshafen (Rhine), Germany
No Drawing. Filed Nov. 1, 1965, Ser. No. 505,977
Claims priority, application Germany, Nov. 7, 1964,
B 79,248
5 Claims. (Cl. 260—830)

ABSTRACT OF THE DISCLOSURE

Curable compositions for moldings, laminates and coatings comprising 1,2-epoxide compounds and polyamides derived from an amine component consisting of 20 to 100 mole percent of tetrahydrotricyclopentadienylene diamine and 0 to 80 mole percent of other monoamines or polyamines, and a dicarboxylic acid component having 3 to 20 carbon atoms, said polyamide having amino groups.

---

This invention relates to curable mixtures based on polyepoxide compounds and basic polyamides, and to cured resins prepared therefrom. It relates in particular to the use of special polyamides as hardeners for polyepoxide compounds.

It is known that moldings, coatings, impregnations and laminated structures may be prepared from curable mixtures of polyepoxide compounds and basic polyamides. Reaction products of aliphatic and aromatic polyamides with dimerized unsaturated fatty acids, adducts of maleic anhydride to unsaturated fatty acids or copolymers of styrene with dehydrated ricinoleic acid have already been used as the polyamide component. These polyamides have the disadvantage, however, that some of them are very inhomogeneous and some discolor to a greater or less extent during reaction with the epoxide compounds and have only limited compatibility with many epoxide compounds.

We have now found that moldings or coatings of curable mixtures based on compounds having on an average more than one 1,2-epoxide group in the molecule and basic polyamides can be prepared having excellent properties, with or without the use of further hardeners or cure accelerators, by using as the polyamide a reaction product of tetrahydrotricyclopentadienylene diamine with a dicarboxylic acid with or without a monocarboxylic acid.

Tetrahydrotricyclopentadienylene diamine having the structural formula:

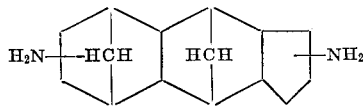

which is to be used for the production of the polyamides is a colorless water-white liquid having a boiling point of about 130° C. at 1 mm. Hg. The diamine is accessible by a simple synthesis from tricyclopentadiene, hydrocyanic acid and sulfuric acid. Benzene and water are first distilled off azeotropically from the solution. The residue is fractionated first at a pressure of about 10 to 25 mm. Hg, removing the bulk of the amine used as extraction agent. Distillation is then continued at a lower pressure, for example at 0.1 mm. Hg 454 parts of tetrahydrotricyclopentadienylene diamine mixture having a boiling point of about 125° C. at 0.1 mm. Hg or 216° to 218° C. at 18 mm. Hg is obtained; this is equivalent to a yield of 78.5% based on tricyclopentadiene. The amine number is 475 (calculated value 483).

The production of tricyclopentadiene is described for example by Alder and Stein in Liebig's Annalen der Chemie, vol. 496 (1932), p. 204 et seq, and vol. 504 (1933), p. 216 et seq. Another literature reference is Beilstein, Handbuch der organischen Chemie, vol. V, E III 5, p. 1685. The production by the above-described process of tetrahydrotricyclopentadienylene diamine is illustrated in the earlier filed pending U.S. application Ser. No. 505,291, filed Oct. 26, 1965, of Paul Raff, Ludwig Schuster, Guenter Becht, and Helmut Doerfel as follows:

A mixture of 1067 parts of 90% sulfuric acid and 780 parts of anhydrous hydrocyanic acid is placed in a vessel having a high-speed stirrer. With intense stirring, 495 parts of molten tricyclopentadiene is sprayed through nozzles having a bore of 0.5 mm. diameter into the mixture of hydrocyanic acid and sulfuric acid, the temperature being kept at 0° to 3° C. by external cooling. A clear brown solution is formed which is stirred for another four hours at 25° to 30° C. The reaction mixture is then diluted with 2500 parts of water and the excess hydrocyanic acid is distilled off completely over a column. The solution remaining behind is boiled under reflux for another half an hour. The clear brown solution is then cooled and 50% caustic soda solution is added at 30° C. while stirring until an alkaline reaction has been set up. The solution is then extracted three times, each time with 300 parts of cyclooctylamine, 500 parts of benzene is added to the combined extracts and then washed with 1000 parts of water.

Tetrahydrotricyclopentadienylene diamine is preferably used as the sole amine component in the production of the basic polyamides, but in many cases the additional use of other primary and/or secondary amines having 1 to 40 carbon atoms in the molecule, preferably those having no reactive groups in the molecule other than amino groups, is of advantage. Suitable amines are monoamines, for example ethylamine, stearylamine or aniline and their substitution products and homologs, and also linear and branched, unsubstituted or substituted diamines of the aliphatic, cycloaliphatic, aromatic and/or araliphatic series, for example ethylene diamine, trimethylene diamine, tetramethylene diamine, pentamethylene diamine, hexamethylene diamine, octamethylene diamine, decamethylene diamine, diaminocyclohexane, xylylene diamine, the various di-(aminomethyl)-benzenes, o-phenylene diamine, m-phenylene diamine, p-phenylene diamine and benzidine. 1,2-bis-aminomethylcyclobutane is very suitable. Amines whose chains or rings contain hetero atoms such as oxygen, nitrogen or sulfur, for example diamino ethers or α-aminopyridine, triamines and polyamines, are also suitable. The compounds having the general formula:

$H_2N-(CH_2)_m-[NH-(CH_2)_m]_n-NH_2$ (in which $m$ is one of the integers from 2 to 6 and $n$ is one of the integers from 1 to 4) are particularly suitable as polyamine; examples of these are diethylene triamine, triethylene tetramine, dipropylene triamine and tripropylene tetramine. A mixture of tetrahydrotricyclopentadienylene diamine with 1,2-bis-aminomethylcyclobutane and an aliphatic polyamine is eminently suitable for the production of the polyamides, particularly for condensation with higher aliphatic dicarboxylic acids, Polyepoxides cured with these polyamides give products of particularly high quality.

The ratio of tetrahydrotricyclopentadienylene diamine to the total amount of the other amines used in the production of the polyamides may vary within wide limits. In general the amine component consists of 20 to 100 mole percent, particularly 50 to 100 mole percent, of tetrahydrotricyclopentadienylene diamine and 0 to 80 mole percent, particularly 0 to 50 mole percent, of the other monoamines or polyamines.

The carboxylic acids having 3 to 20 carbon atoms used for the production of the polyamides to be used according to this invention are preferably linear or branched aliphatic dicarboxylic acids, such as adipic acid, glutaric acid sebacic acid, suberic acid, 1,8-octane dicarboxylic acid and 1,9-nonane dicarboxylic acid, and the dicarboxylic acids may advantageously bear higher aliphatic hydrocarbon radicals as substituents. Monocarboxylic acids such as acetic acid, benzoic acid or stearic acid may be additionally employed in the preparation of the polyamides in conventional manner.

The molar ratio of carboxylic acid to amine may vary from about 1:1.1 to about 1:3 for the preparation of the basic polyamides.

The polyamides may be prepared by conventional methods, particularly by condensation of the amines with the carboxylic acids under an atmosphere of nitrogen at temperatures of from 100° to 350° C. Production of the basic polyamides is not the subject of the present invention.

Compounds which on an average contain more than one 1,2-epoxide group in the molecule include particularly aliphatic glycidyl ethers which may be obtained by conventional methods by reaction of polyalcohols, such as pentaerythritol, glycerol, trimethylolpropane or butanediol, with epichlorohydrin. Other suitable polyepoxides are aromatic polyglycidyl ethers and polyglycidyl esters, and also reaction products of polyamines with epichlorohydrin. Polyepoxides, which are obtainable from unsaturated hydrocarbons and hydroperoxides, such as vinylcyclohexene dioxide, dipentene dioxide and cyclododecane triepoxide, may also be used successfully. Another group includes the glycidyl ethers of novalaks which are obtained by condensation of an aldehyde with a polyhydric phenol. The said polyepoxides may be used alone or mixed with each other if necessary with the addition of monoepoxide compounds.

The amount of polyamides use according to the invention in the mixtures with the polyepoxide compounds depends on their equivalent weights which are defined as the amount of polyamide containing 1.008 parts of active hydrogen (according to Zerewitinoff). In general the basic polyamides are used in such amounts that one hydrogen atom attached to nitrogen is available in the polyamides for each epoxide group in the polyepoxide compounds, i.e. in equivalent amounts. In some cases however it is advantageous to use an excess of polyamide, for example up to three times the equivalent amount.

It is within the scope of the present invention to use the basic polyamides in combination with other hardeners or cure accelerators. Examples of these are basic catalysts, such as potassium hydroxide, sodium methylate, tertiary amines, phosphines, stibines, bismuthines, acid catalysts, such as sulfuric acid, phosphoric acid or boric acid, Friedel-Crafts catalysts, amides and polycarboxylic anhydrides. Examples of suitable additional hardeners are described in the book by A. M. Paquin, "Epoxydverbindungen und Epoxydharze" (Epoxide compounds and epoxide resins), Springer-Verlag, Berlin-Gottingen-Heidelberg, 1958, 470 to 530). The expert will therefore be able to adapt the processing of the mixtures to the particular requirements by suitable modification of the hardener. When various hardeners are combined, the proportion of the hardener according to this invention may be appropriately decreased, for example to half of the equivalent amount required for curing all epoxide groups.

The mixtures of polyepoxide compounds and basic polyamides according to the invention may be further processed with or without the conventional solvents, such as ketones, esters, alcohols, aliphatic or aromatic hydrocarbons, at room temperature or more rapidly at 60° to 160° C. For some purposes it is advantageous to use both the epoxy compounds and the polyamides in the form of their aqueous dispersions.

Moldings, laminates and lacquer coatings may be prepared from the curable mixtures, and moldings and coatings are intended to include the products which result by using the curable mixtures according to the invention as trowelling mixes, dipping resins and embedding compounds. The mixtures, if desired in association with other adhesives raw materials, may be used as two-component adhesives for bonding textiles, metals and plastics.

The new polyamides have excellent compatibility with most commercial epoxide compounds and consequently clear castings and lacquers may be prepared having particularly good mechanical properties. It is also an advantage that the color of the products used according to this invention is paler than that of prior art basic polyamides.

The cured substances prepared by the process according to this invention are hard (as may be seen from the high pendulum hardness values) but yet flexible (as may be seen from the high Erichsen values) resins having high gloss and good resistance to water and chemical reagents.

The invention is illustrated by the following examples. The parts specified in the examples are parts by weight. Determination of the equivalent weights is carried out by the method of Zerewitinoff.

Example 1

328 parts (1 mole) of 1-octylnonane dicarboxylic acid-(1,9) is heated under a nitrogen atmosphere with 232 parts (1 mole) of tetrahydrotricyclopentadienylene diamine and 103 parts (1 mole) of diethylene triamine first to 150° C. and then within five hours to 260° C. while distilling off the water formed through a vapor separator. A pale highly viscous resin is obtained having an equivalent weight of 103.

10.3 parts of a 50% solution of the polyamide thus obtained in a mixture of xylene and butanol (ratio by volume 3:1) is mixed with 8.1 parts of an aliphatic polyglycidyl ether having an epoxide number of 0.62. The pot life of this curable mixture at room temperature is twenty hours. Lacquer coatings prepared therewith on sheet steel and sheets of glass are cured either at room temperature or at 120° C. The cured lacquerings are clear, exhibit a good flow, a high gloss and have an excellent hardness and flexibility.

(a) Cured for twenty hours at room temperature: Erichsen number: more than 9.0; pendulum value: 135 seconds.

(b) Cured for one hour at 120° C.: Erichsen number: 7.5; pendulum value: 165 seconds.

Example 2

48.66 parts of adipic acid, 77.5 parts of tetrahydrotricyclopentadienylene diamine and 34.5 parts of diethylene triamine are heated under an atmosphere of nitrogen first to 180° C. and then within six hours to 260° C. as described in Example 1. A pale viscous resin is obtained having an equivalent weight of 83.5.

8.35 parts of a 50% solution of the condensation product in a mixture of xylene and butanol (volumetric ratio 3:1) is mixed with 8.1 parts of an aliphatic polyglycidyl ether having an epoxide number of 0.62. The pot life of this curable mixture at room temperature is twenty hours. Lacquer coatings prepared therewith on sheet steel and sheets of glass set to touch within fifteen minutes, have a good flow and are clear and transparent. The cured lacquer has the following properties:

(a) Cured at room temperature for twenty-four hours: Erichsen number: more than 9.5; pendulum value: 127 seconds;

(b) Cured at 120° C. for one hour: Erichsen number: 7.0; pendulum value: 175 seconds.

Example 3

76.6 parts of dodecane dicarboxylic acid, 77.5 parts of tetrahydrotricyclopentadienylene diamine and 34.5 parts of diethylene triamine are heated under an atmosphere of nitrogen first to 180° C. and then within six hours to 260° C. according to Example 1. A colorless viscous resin is obtained having an equivalent weight of 105.

10.5 parts of a 50% solution of the polyamide obtained in a mixture of xylene and butanol (volumetric ratio 3:1) is mixed with 8.1 parts of an aliphatic polyglycidyl ether having an epoxide value of 0.62. The pot life of the mixture at room temperature is twenty hours. Lacquerings prepared therewith on sheet steel and sheets of glass have a good flow, are clear and transparent, and set to touch within twenty minutes. The cured lacquer has the following properties:

(a) Cured for twenty-four hours at room temperature: Erichsen value: 9.5; pendulum value: 143 seconds;

(b) Cured for one hour at 120° C.: Erichsen value: 8.1; pendulum value: 168 seconds.

Example 4

164 parts (0.5 mole) of 1-octylnonane dicarboxylic acid-(1,9) is heated with 58 parts (0.25 mole) of tetrahydrotricyclopentadienylene diamine, 28.5 parts (0.25 mole) of 1,2-bisaminomethylcyclobutane and 51.5 parts (0.5 mole) of diethylene triamine under an atmosphere of nitrogen, first to 150° C. and then within six hours of 260° C. while distilling off the water formed through a vapor separator. A pale highly viscous resin having an equivalent weight of 106 is obtained which is particularly suitable for the production of clear colorless moldings and coatings free from solvents.

To prepare a molding, 16.2 parts of an aliphatic polyglycidyl ether having an epoxide value of 0.62 is mixed with 10.6 parts of the polyamide prepared and the mixture is cured at room temperature in a mold, or more advantageously for two hours at 70° C. Colorless clear moldings having a thermal stability under load of 95° to 100° C. as well as excellent hardness and flexibility are obtained.

We claim:

1. A process for curing 1,2-epoxide compounds having on an average more than one 1,2-epoxide group in the molecule by reaction under conventional reaction conditions with polyamides containing free amine groups wherein the polyamide used is the reaction product of an amine composition of 20–100 mol percent of tetrahydrotricyclopentadienylene diamine and 0–80 mol percent of at least one of other monoamines and polyamines with a dicarboxylic acid having 3 ot 20 carbon atoms.

2. A composition of matter comprising 1,2-epoxide compounds having on an average more than one 1,2-epoxide group in the molecule and polyamides which are the reaction product of an amine composition of 20–100 mol percent of tetrahydrotricyclopentadienylene diamine and 0–80 mol percent of at least one of other monoamines and polyamines with a dicarboxylic acid having 3 to 20 carbon atoms, said polyamide containing free amine groups.

3. A composition as claimed in claim 2 wherein the polyamides are derived from a mixture of tetrahydrotricyclopentadienylene diamine and dicarboxylic acids having 3 to 20 carbon atoms, the mole ratio of amine to carboxylic acid being from about 1.1:1 to about 3:1.

4. A composition as claimed in claim 2 wherein the polyamide is present in an about equivalent amount up to an about three times equivalent amount with reference to the amount of 1,2-epoxide compounds.

5. A composition as claimed in claim 2 wherein said other monoamines and/or polyamines comprise a polyalkylene polyamine.

No references cited.

MURRAY TILLMAN, *Primary Examiner.*

P. LIEBERMAN, *Assistant Examiner.*